United States Patent
Holmes et al.

(10) Patent No.: US 9,582,797 B1
(45) Date of Patent: Feb. 28, 2017

(54) DYNAMIC ADJUSTMENT OF ITEM FULFILLMENT TIMES

(71) Applicant: Square, Inc., San Francisco, CA (US)

(72) Inventors: Jason Holmes, San Francisco, CA (US); Logan Johnson, San Francisco, CA (US); Ray Ryan, San Francisco, CA (US); Jotham Taylor, III, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 357 days.

(21) Appl. No.: 14/461,072

(22) Filed: Aug. 15, 2014

(51) Int. Cl.
| | |
|---|---|
| *G06F 17/50* | (2006.01) |
| *G06Q 20/32* | (2012.01) |
| *G06Q 20/20* | (2012.01) |
| *G06Q 50/12* | (2012.01) |
| *G06Q 10/00* | (2012.01) |
| *G06Q 30/02* | (2012.01) |

(52) U.S. Cl.
CPC ........... *G06Q 20/325* (2013.01); *G06Q 20/20* (2013.01); *G06Q 50/12* (2013.01)

(58) Field of Classification Search
CPC .... G06Q 10/02; G06Q 30/0281; G06Q 50/10; G06Q 10/025; G06Q 10/06313; G06Q 10/087; G06Q 30/02; G06Q 50/12; H04L 67/18; H04L 47/28; H04L 67/24; H04W 64/00; H04W 4/02; H04W 4/023; H04W 4/008
See application file for complete search history.

(56) References Cited

U.S. PATENT DOCUMENTS

| | | | | |
|---|---|---|---|---|
| 6,952,181 | B2* | 10/2005 | Karr | G01C 21/206 342/450 |
| 8,744,749 | B2* | 6/2014 | Gupta | H04W 64/00 342/386 |
| 9,247,447 | B1* | 1/2016 | Vivanco | H04W 28/0226 |
| 9,449,121 | B2* | 9/2016 | Marti | G06F 17/5009 |
| 2004/0203832 | A1* | 10/2004 | An | H04W 16/06 455/453 |
| 2005/0233748 | A1* | 10/2005 | Robinson | G01S 5/0289 455/440 |
| 2006/0022048 | A1* | 2/2006 | Johnson | H04L 69/329 235/462.1 |
| 2007/0042770 | A1* | 2/2007 | Yasui | H04M 3/42229 455/428 |
| 2008/0214203 | A1* | 9/2008 | Titli | G01S 5/14 455/456.1 |
| 2009/0228325 | A1* | 9/2009 | Simmons | G06Q 10/06313 705/7.23 |

(Continued)

OTHER PUBLICATIONS http://www.cse.buffalo.edu/~demirbas/publications/lineking.pdf.*

(Continued)

*Primary Examiner* — Ryan Zeender
*Assistant Examiner* — Dana Amsdell
(74) *Attorney, Agent, or Firm* — Lee & Hayes, PLLC

(57) ABSTRACT

Techniques and arrangements for dynamically adjusting item fulfillment times based, in part, on how many mobile electronic devices are currently located at the merchant. If the number is greater than a baseline number of devices by more than a threshold, then an expected wait time may be adjusted upwards. If the number is less than a baseline number of devices by more than a threshold, then the expected wait time may be adjusted downwards.

21 Claims, 4 Drawing Sheets

(56) References Cited

U.S. PATENT DOCUMENTS

| | | | | |
|---|---|---|---|---|
| 2010/0015994 | A1* | 1/2010 | Mcbride | H04W 4/02 455/456.1 |
| 2010/0063854 | A1* | 3/2010 | Purvis | G06Q 10/02 705/5 |
| 2011/0158187 | A1* | 6/2011 | Komamura | H04W 72/0486 370/329 |
| 2011/0285591 | A1* | 11/2011 | Wong | G01S 5/0036 342/451 |
| 2012/0303402 | A1* | 11/2012 | Koury | G06Q 10/06 705/7.13 |
| 2013/0117695 | A1* | 5/2013 | Hammoud | G06Q 30/00 715/761 |
| 2013/0332208 | A1* | 12/2013 | Mehta | G06Q 10/02 705/5 |
| 2014/0122040 | A1* | 5/2014 | Marti | G06F 17/5009 703/6 |
| 2014/0163934 | A1* | 6/2014 | Zhang | G06Q 10/06 703/2 |
| 2014/0180960 | A1* | 6/2014 | Sagfors | G06Q 30/0281 705/346 |
| 2014/0368601 | A1* | 12/2014 | deCharms | H04W 4/021 348/14.02 |
| 2015/0038171 | A1* | 2/2015 | Uilecan | G06Q 10/109 455/456.3 |
| 2015/0081348 | A1* | 3/2015 | Avera | G06Q 10/02 705/5 |
| 2015/0186803 | A1* | 7/2015 | Stong | G06Q 30/0226 705/5 |
| 2015/0186957 | A1* | 7/2015 | Barr | G06Q 30/0281 705/346 |
| 2016/0021507 | A1* | 1/2016 | Gaines | H04W 4/028 455/456.2 |
| 2016/0095188 | A1* | 3/2016 | Verberkt | H05B 37/0227 315/151 |
| 2016/0148121 | A1* | 5/2016 | Durham | G06Q 50/22 705/2 |
| 2016/0192149 | A1* | 6/2016 | Zises | H04W 4/027 455/456.3 |

OTHER PUBLICATIONS

Transportation Research Record: Journal of Transportation Research Board, No. 2177, Transportation Research Board of the National Academies, Washington DC, 2010, pp. 60-68.*

2009 International Conference of Soft Computing and Pattern Recognition, Economic and Synergistic Pedestrian Tracking System for Indoor Environments Tomoya Ishikawa, Masakatsu Kourogi, Takashi Okuma, Takeshi Kurata Center for Service Research National Institute of Advanced Industrial Science and Technology, AIST, Tsukuba, Japan.*

* cited by examiner

DYNAMIC ADJUSTMENT OF ITEM FULFILLMENT TIMES

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
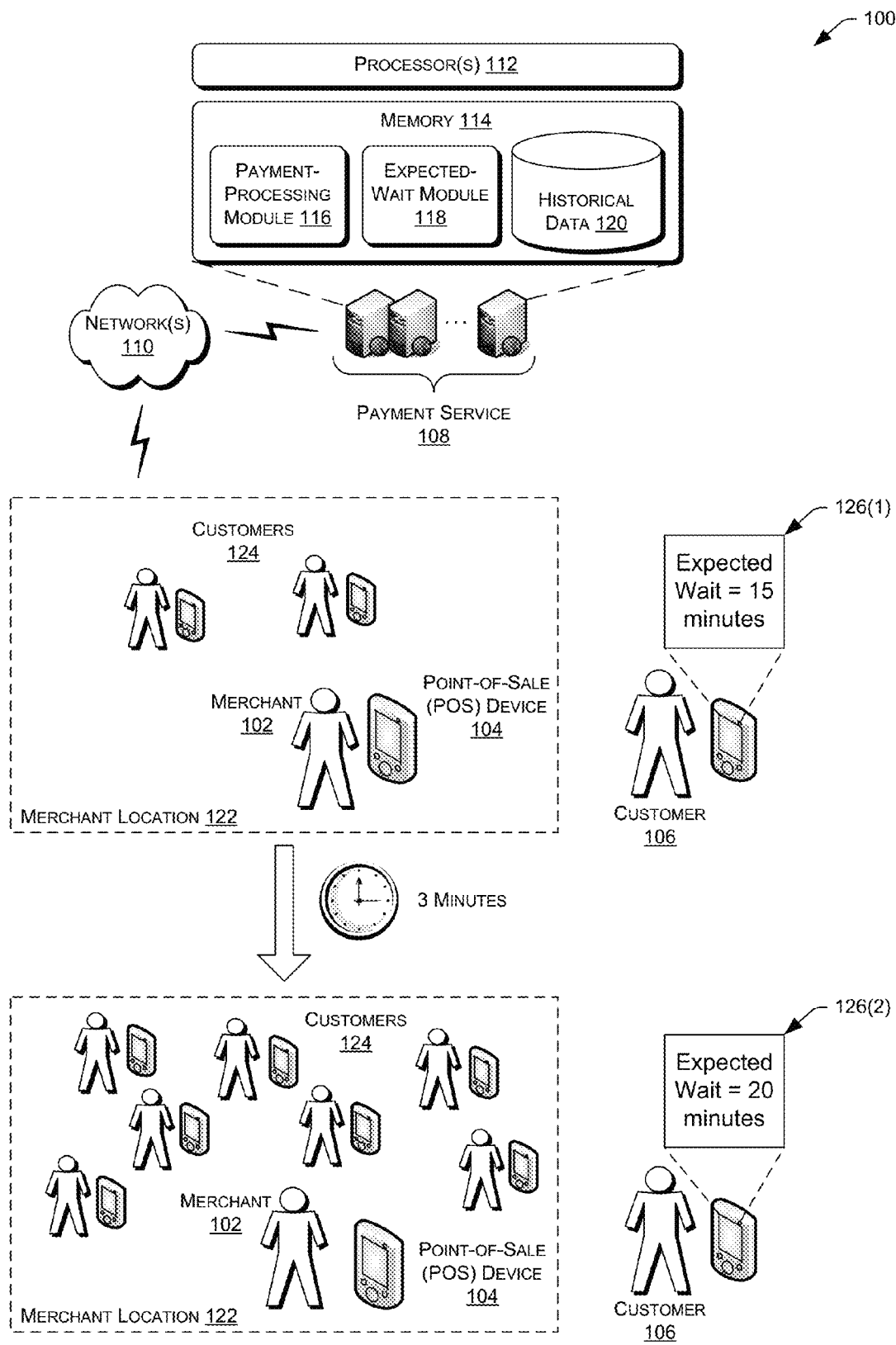
FIG. 1 illustrates an example environment that includes a merchant operating a mobile point-of-sale (POS) device to conduct transactions with customers. In this example, one particular customer has ordered an item from the merchant, who has provided an indication of an expected wait time for the order to the customer. However, because the merchant has determined it has become busier since the time of providing the indication, the merchant sends an updated expected wait time to the device of the customer.

Some implementations described herein include techniques and arrangements for dynamically adjusting item fulfillment times based, in part, on how many mobile electronic devices are currently located at the merchant.

For instance, a customer may order an item from a merchant that takes some time to fulfill. The item may comprise a physical good (e.g., food, an electronic device, a car, etc.), a digital good (e.g., a video, a song, etc.), or a service (e.g., a seat at a restaurant, a massage, etc.). Before or after ordering the item, the merchant may, via a merchant device, inform the customer of an expected wait time to fulfill the item. For instance, when a customer places a to-go order from a restaurant, the restaurant may determine a time that the restaurant expects it needs before the order will be ready for pick-up. The restaurant may then provide this information to the customer (e.g., over the phone, by sending a message to an electronic device of the user, or the like).

At a later time, a device of the merchant (e.g., restaurant) may determine whether to adjust the expected wait time based on the presence (or lack thereof) of other customers at the location of the merchant. For instance, an electronic device of the merchant, such as a point-of-sale (POS) device, may determine a current number of mobile electronic devices within a threshold distance of the merchant. The device of the merchant may then compare this number to a baseline number to determine whether the merchant currently has a significantly large number of customers nearby or a very small number of customers. If the merchant device determines that a large number of customers are present at the location of the merchant, then the merchant device (e.g., the POS device) may send an indication to the electronic device of the customer to revise, upwards, the expected wait time. If, however, the merchant device determines that there are relatively few customers currently at the merchant, then the merchant device may revise, downwards, the expected wait time and may send this indication to the device of the customer. That is, the techniques and arrangements may, dynamically and in real-time, update the expected wait time to more accurately reflect the state of the merchant (i.e., whether the merchant is particularly busy or slow).

In the example from above, for instance, envision that a customer places a to-go order and, in response, the merchant device sends an indication to the device of the customer indicating that the expected wait time is fifteen minutes. That is, this indication informs the customer that the food item will be ready for pick-up in fifteen minutes time. Thereafter, however, the POS device of the merchant determines that a very large number of mobile electronic devices are present at the restaurant. That is, the POS device or other device of the merchant may determine a number of mobile electronic devices in proximity to the POS device or other device and then compare this number to a baseline number. The baseline number may comprise an average or median number of mobile electronic devices present at the restaurant at a particular time-of-day and/or day-of-the-week. The POS device, or another device, may then determine whether the current number of devices is greater or lesser than the baseline number by more than a threshold. For instance, the merchant device may determine that while the average number of mobile electronic devices at the restaurant at the current time on the current day-of-the-week is ten, there are currently thirty mobile electronic devices present. As such, given that the merchant appears to be much busier than usual at this particular time and day (using the count of mobile electronic devices as a proxy for this information), the merchant device may revise the expected wait time upwards. For instance, the merchant device or another device may send an indication to the electronic device of the customer that previously provided the order indicating that it would now take twenty minutes (for instance) to fulfill the to-go order. By adjusting expected wait times in this manner, the merchant is able to provide a more accurate, real-time estimate to customers for item orders.

While the above provides one example, the described techniques may operate in other environments. For instance, a merchant device may continually or periodically update expected wait times for orders yet to be placed based on a current number of mobile electronic devices located at the merchant. For instance, a pharmacy may update an expected wait time to speak to a pharmacist based on a number of mobile electronic devices currently located at the pharmacy. Or, a restaurant may update an expected wait time to be seated at the restaurant based on a number of mobile electronic devices currently located at the restaurant. While a few examples have been discussed, it is to be appreciated that the techniques may apply in any other environment where merchants may desire to update expected wait times for future item orders and/or for item orders that have been ordered but not yet fulfilled.

As discussed below, the techniques may determine a count of mobile electronic devices proximate to the merchant in multiple ways. For instance, a merchant may operate a POS device that executes a merchant application.

Customer devices, meanwhile, may also operate corresponding client applications for the purpose of paying for items offered by the merchant. The merchant application may utilize location sensors and/or other sensors of the device to determine a number of mobile electronic devices that are operating the corresponding client application and that are proximate to the POS device. This may be based on GPS coordinates of the devices, based on the customer devices having established a short-range connection with the POS device (e.g., Bluetooth, etc.), based on the customer devices being tethered to a wireless access point (WAP) that is proximate to the merchant location, or the like. In another example, the POS device or another entity may determine how many devices are present by determining how many customers have "checked in", with a social networking application or the like, at the location of the merchant. In another example, a merchant device may identify a number of client devices by identifying a number of client devices (irrespective of the software executing on the client devices) within a certain range of the merchant device. For instance, the merchant device may detect client devices that are emitting certain signals in proximity to the merchant device, such as Bluetooth signals, etc. While a few examples have been discussed, it is to be appreciated that the techniques may determine a number of mobile electronic devices located at the merchant in any other number of ways.

Furthermore, the techniques may take other factors into account when adjusting expected wait times. These factors may include current weather, current traffic, current events that are occurring proximate to the merchant, or the like. For instance, a POS device of the merchant or another entity may determine, from one or more traffic services, current traffic on roads near the merchant. If the traffic is particularly heavy or particularly light, then expected wait times may be adjusted accordingly. Similarly, the POS device or another entity may determine, from one or more weather services, whether any inclement weather is expected. If so, then the techniques may adjust, upwards, expected wait times, given that travel to the merchant for pick-up may be impeded by the weather. In other examples, the POS device or another entity may determine whether any events are scheduled to occur in the same city and/or area of the merchant around the time of expected fulfillment for certain item orders. If so, then the POS device or another entity may adjust, upwards, the expected wait times for those item orders, given that the event may make traffic heavier and may increase the busyness level of the merchant. Of course, other events may draw customers away from particular businesses and, therefore, the merchant device or another device may adjust expected wait times downwards.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 3:
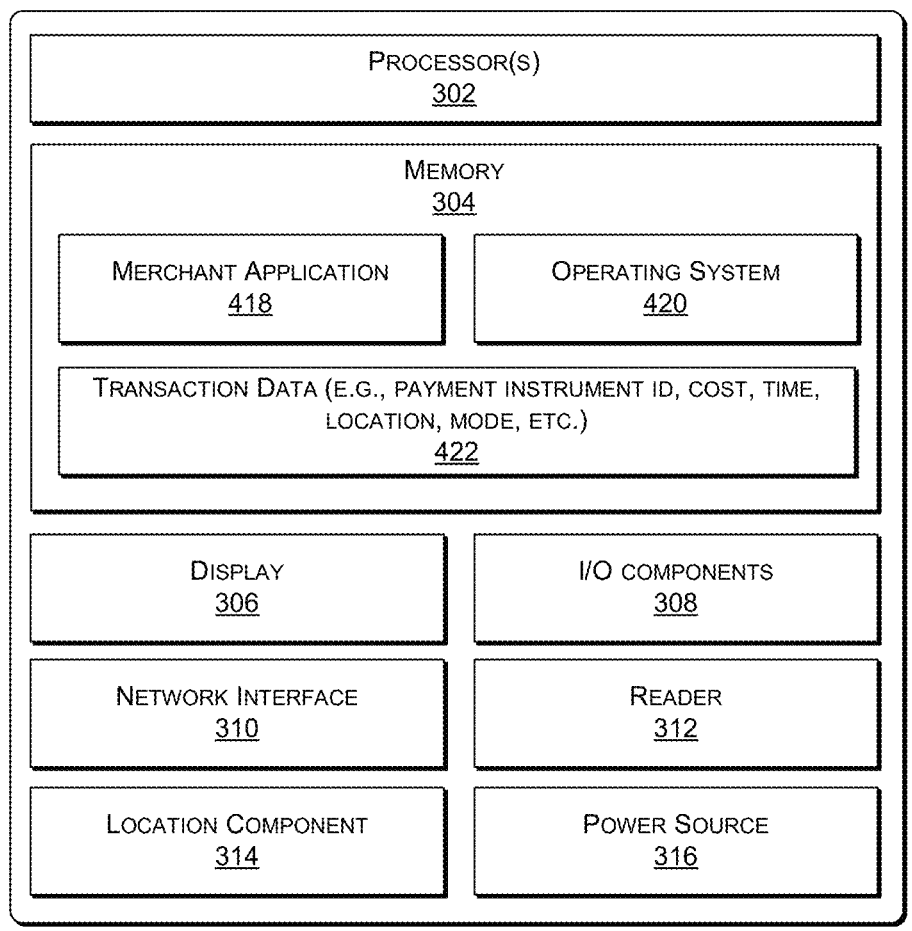
FIG. 3 illustrates select components of a POS device that a merchant described herein may utilize.

FIG. 1 illustrates an example environment 100 that includes a merchant 102 operating a point-of-sale (POS) device 104 to engage in various transactions with respective customers, such as customer 106. The POS device 104 may comprise any sort of mobile or non-mobile device that includes an instance of a merchant application (as illustrated in FIG. 3). The merchant application may provide POS functionality to the POS device 104 to enable the merchant 102 (e.g., an owner, employees, etc.) to accept payments from the customer 106.

In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of items (goods and/or services) that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of the customer 106 may include one or more magnetic strips for providing card and customer information when swiped in a card reader. In other examples, other types of payment cards may be used, such as smart cards having a built-in memory chip that is read by the device 104 when the card is "dipped" into the reader, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104 can send the transaction information to a payment service 108 over a network 110, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customer 106, the POS device 104 may provide the stored information to the payment service 108 over the network 110. The network 110 may represent any one or more wired or wireless networks, such as a WiFi network, a cellular network, or the like. In an online transaction, the POS device may send this information to the payment service 108 over the network 110 substantially contemporaneously with the transaction with the customer.

As illustrated, the payment service 108 may include one or more processors 112 and memory 114, which may store a payment-processing module 116, an expected-wait module 118, and historical data 120 indicating typical wait times and typical customer volumes at merchants, such as the merchant 102.

The payment processing module 116 may function to receive the information regarding a transaction from the POS device 104 and attempt to authorize the payment instrument used to conduct the transaction, as described above. The payment processing module 116 may then send an indication of whether the payment instrument has been approved or declined back to the POS device 104.

When a customer and a merchant enter into an electronic payment transaction, the transaction is processed by electronically transferring funds from a financial account associated with the customer to a financial account associated with the merchant. As such, the payment processing module 116 may communicate with one or more computing devices of a card network (or "card payment network"), e.g., MasterCard®, VISA®, over the network 110 to conduct financial transactions electronically. The payment processing module 116 can also communicate with one or more computing devices of one or more banks over the network 110. For example, the payment processing module 116 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In some instances, the POS device 104 and/or the payment service 108 may dynamically update expected wait times for item orders made by the customers, such as the customer 106. FIG. 1, for instance, illustrates an example where the customer 106 orders an item for later fulfillment by the merchant 102. For instance, the customer 106 may utilize a mobile electronic device executing a client application to communicate with the POS device 104 of the merchant 102. The customer may place an order to the POS device 104, which may receive the order at a location 122 of the merchant 102. As illustrated, a time of receiving the order, relatively few customers 124 may be present at the merchant location 122.

After receiving the order, the POS device 104 or the payment service 108 may provide an indication 126(1) for output on the customer device indicating a current expected wait time for the merchant 102 to fulfill the order. This expected wait time may, in some instances, be based on the historical data 120 of wait times. For instance, if the customer were ordering food from the merchant 102, the merchant 102 or the payment service 108 may indicate how long the merchant expects it will take for the food to be ready for pick-up. In this example, the expected wait time is fifteen minutes.

FIG. 1 illustrates, however, that after the customer 106 places the order, the number of customers 124 has significantly increased. The POS device 104 or the expected-wait module 118 may determine (e.g., estimate) a number of mobile electronic devices currently located at the merchant location 122. For instance, the merchant application operating on the POS device 104 may determine a number of mobile electronic devices within a threshold distance of the POS device 104 and that are executing a corresponding client application for interacting with the merchant application. In another example, the POS device 104 may determine a number of devices that are communicatively coupled to the POS device 104 via a short-range communication, such as Bluetooth. In yet another example, the POS device 104 and/or the expected-wait module 118 may determine a number of mobile electronic devices currently coupled to a wireless access point (WAP) that is at or proximate to the merchant location 122. In still another example, the POS device 104 and/or the expected-wait module 118 may determine a number of mobile electronic devices that are within a set of GPS coordinates associated with the merchant location 122. While a few examples are listed, it is to be appreciated that the number of mobile electronic devices located at the merchant location 122 may be determined in any other way.

After determining the number of mobile electronic devices at the merchant location 122, the POS device 104 and/or the expected-wait module 118 may compare this number to a baselines number of mobile electronic devices, which may be stored in the historical data 120. This baseline number may comprise an average or median amount of mobile electronic devices at the merchant location 122 at a particular time-of-day (e.g., the current time) on a particular day-of-the-week (e.g., the current day), as measured over one or more prior days. After determining this baseline number, the POS device 104 may compare the current number to the baseline number and determine whether the difference is greater than a threshold. If the number is greater by the threshold amount, as is the case in FIG. 1, then the POS device 104 and/or the expected-wait module 118 may adjust a current wait time for previously received orders or may indicate the expected wait time for orders that a customer may place at the current time. In the former instances, and to illustrate, a customer may place an order for food from the comfort of their home at 11:30 am. A POS device of the restaurant may queue the food order and may send an indication, to a device of the customer, that the food will be ready for pickup in thirty minutes. Before those thirty minutes elapse, however, the POS device of the restaurant may determine an unusually large number of client devices present at the restaurant, indicating that the kitchen may expect an increased level of busyness. Therefore, the POS device may send an update to the customer device, indicating that the food order will not be available until 12:15 pm, rather than the originally prescribed 12:00 pm.

In other instances, a merchant may queue up an order when a customer arrives at the merchant. For instance, a POS or other device of the restaurant may send an indication to the customer device indicating that the customer's food will be ready ten minutes after the customer arrives at the restaurant. When the customer arrives, however, and the food order is queued, the POS device may update the estimated wait time (up or down) due to a change in busyness of the restaurant in the time between the placement of the order and the customer's arrival.

In the illustrated example, in response to determining that the number of customers 124 has increased (using the number of devices as a proxy) in the three minutes since the customer 106 placed the order, the POS device 104 and/or the expected-wait module 118 adjusts upwards the expected wait time from fifteen minutes to twenty minutes. This may include sending an updated indication to the customer device, as illustrated. The POS device 104 and/or the expected-wait module 118 may similar update any other orders that have been made but not yet fulfilled.

Figure 2A:
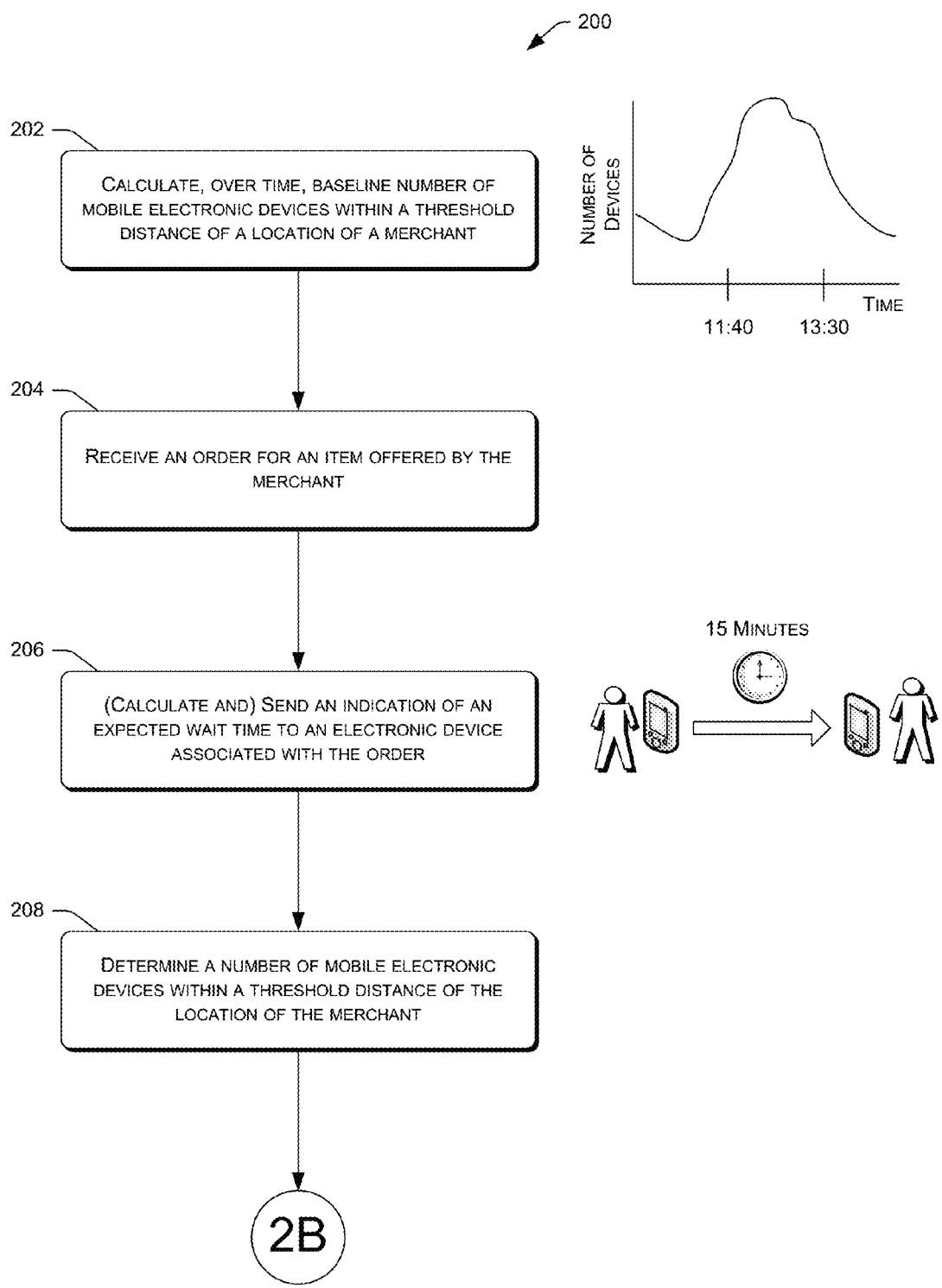
FIGS. 2A-B illustrate a flow diagram of a process for sending an updated expected wait time to a customer of a merchant.
Figure 2B:
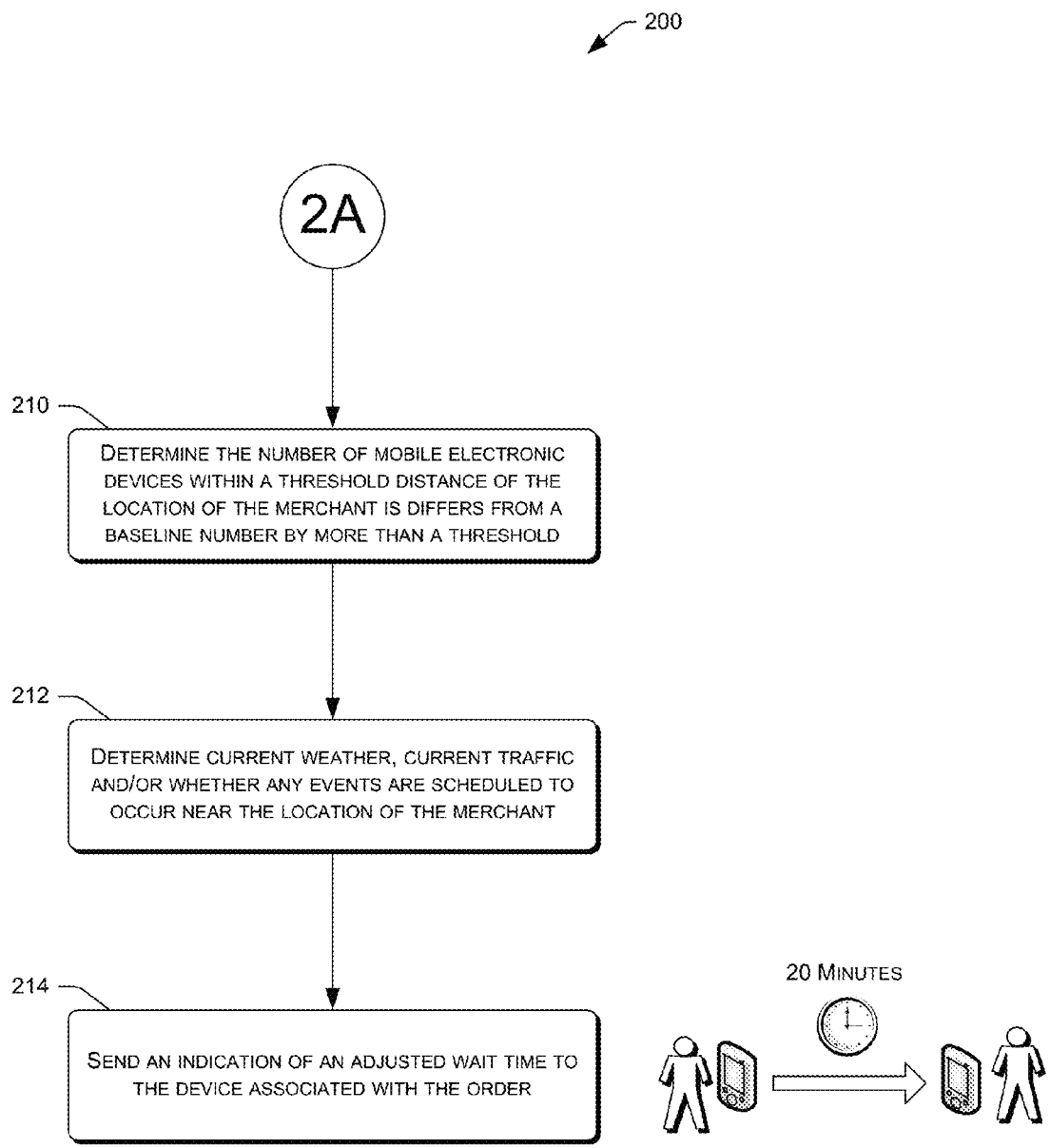

FIGS. 2A-B illustrate a flow diagram of a process 200 for sending an updated expected wait time to a customer of a merchant. The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 200, and other processes described herein, may be performed by a POS device, by a remote payment service (e.g., payment service 108), by another entity, or by a combination thereof.

At 202, the process 200 calculates, over time, a baseline number of mobile electronic devices within a threshold distance of a location of a merchant. As illustrated, this baseline number may be illustrated as a graph where the x-axis comprises the average or median number of devices within the threshold distance of the merchant and the y-axis represents time. In some instances, the graph may extend over a week or other length of time, such that a baseline number exists for any time-of-day during the week. To calculate this number, the process 200 may measure the number of devices at the location of the merchant over time until an average or median is determined for all or a subset of times during the week.

At 204, the process 200 receives an order for an item offered by the merchant. This may be an order for food, for a seat at a restaurant, for an appointment at a salon, or the like. In some instances, a customer places the order via a client application executing on an electronic device of the customer, while the merchant receives the order at a merchant application (illustrated at FIG. 3).

At 206, the process 200 may calculate and send an indication of an expected wait time to a device associated with the order (e.g., to the client device that sent the order or to another device associated with the customer). As described above, the expected wait time indicates how long the merchant expects fulfillment of the order to take. For instance, the merchant here predicts that it will take fifteen minutes before the item will be ready (e.g., food, seat at a restaurant, etc.).

At 208, the process 200 determines a number of mobile electronic devices within a threshold distance of the location of the merchant. As described above, the POS device at a merchant may determine a count of mobile electronic devices at the merchant by, for example, determining how many devices are in short-range communication with the merchant application operating on the POS device.

FIG. 2B continues the illustration of the process 200. At 210, the process 200 determines that the number of mobile electronic devices currently within the threshold distance of the location of the merchant differs from the baseline number of devices for that particular time period by more than a threshold. For instance, if the time is currently 10 am on a Tuesday, then the process 200 may determine that the number of devices at the location of the merchant differs from the number typically found at 10 am on Tuesdays by more than a threshold amount (e.g., 10% more, 50% more, 100% more, 10% less, 50% less, 100% less, 10 additional or fewer devices, 100 additional or fewer devices, a number of additional or fewer devices that exceeds the average or median by a certain amount (e.g., a standard deviation), etc.).

At 212, the process 200 may determine one or more other factors, such as current weather near the location of the merchant, current traffic near the location of the merchant, whether any events are scheduled near the location of the merchant, or the like. As described above, these other factors may influence the amount of time needed to fulfill the order and, hence, may influence the adjustment of the item fulfillment time.

At 214, the process 200 sends an indication of an adjusted wait time to the device associated with the order. For instance, in this example the POS device 104 and/or the payment service 108 may send an indication to the mobile electronic device indicating that the expected wait time is now twenty minutes.

FIG. 3 illustrates select example components of an example POS device 300 according to some implementations. The POS device 300 may be any suitable type of computing device, e.g., mobile, semi-mobile, semi-stationary, or stationary. Some examples of the POS device 300 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 300 includes at least one processor 302, memory 304, a display 306, one or more input/output (I/O) components 308, one or more network interfaces 310, at least one card reader 312, at least one location component 314, and at least one power source 316. Each processor 302 may itself comprise one or more processors or processing cores. For example, the processor 302 can be implemented as one or more microprocessors, microcomputers, microcontrollers, digital signal processors, central processing units, state machines, logic circuitries, and/or any devices that manipulate signals based on operational instructions. In some cases, the processor 302 may be one or more hardware processors and/or logic circuits of any suitable type specifically programmed or configured to execute the algorithms and processes described herein. The processor 302 can be configured to fetch and execute computer-readable processor-executable instructions stored in the memory 304.

Depending on the configuration of the POS device 300, the memory 304 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 304 may include, but is not limited to, RAM, ROM, EEPROM, flash memory, solid-state storage, magnetic disk storage, optical storage, and/or other computer-readable media technology. Further, in some cases, the POS device 300 may access external storage, such as RAID storage systems, storage arrays, network attached storage, storage area networks, cloud storage, or any other medium that can be used to store information and that can be accessed by the processor 302 directly or through another computing device or network. Accordingly, the memory 304 may be computer storage media able to store instructions, modules or components that may be executed by the processor 302. Further, when mentioned, non-transitory computer-readable media exclude media such as energy, carrier signals, electromagnetic waves, and signals per se.

The memory 304 may be used to store and maintain any number of functional components that are executable by the processor 302. In some implementations, these functional components comprise instructions or programs that are executable by the processor 302 and that, when executed, implement operational logic for performing the actions and services attributed above to the POS device 300. Functional components of the POS device 300 stored in the memory 304 may include a merchant application 318, which may interact with applications executing on client devices to allow customers to pay for items offered by the merchant. The merchant application 318 may present an interface on the POS device 300 to enable the merchant to conduct transactions, receive payments, and so forth, as well as communicating with the payment service 108 for processing payments and sending transaction information. Further, the merchant application 318 may present an interface to enable the merchant to manage the merchant's account, and the like. Finally, the merchant application 318 may determine a number of mobile electronic devices that are within a threshold distance of the location of the merchant. The merchant application 318 may also calculate and/or adjust an expected wait time for orders already received or yet to be received at the merchant.

Additional functional components may include an operating system 320 for controlling and managing various functions of the POS device 300 and for enabling basic user interactions with the POS device 300. The memory 304 may also store transaction data 322 that is received based on the merchant associated with the POS device 300 engaging in various transactions with customers, such as the example customer 106 from FIG. 1.

In addition, the memory 304 may also store data, data structures and the like, that are used by the functional components. For example, this data may include item information that includes information about the items offered by the merchant, which may include images of the items, descriptions of the items, prices of the items, and so forth. Depending on the type of the POS device 300, the memory 304 may also optionally include other functional components and data, which may include programs, drivers, etc., and the data used or generated by the functional components. Further, the POS device 300 may include many other logical, programmatic and physical components, of which those described are merely examples that are related to the discussion herein.

The network interface(s) 310 may include one or more interfaces and hardware components for enabling communication with various other devices over the network or directly. For example, network interface(s) 310 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 3 further illustrates that the POS device 300 may include the display 306 mentioned above. Depending on the type of computing device used as the POS device 300, the display 306 may employ any suitable display technology. For example, the display 306 may be a liquid crystal display, a plasma display, a light emitting diode display, an OLED (organic light-emitting diode) display, an electronic paper display, or any other suitable type of display able to present digital content thereon. In some examples, the display 306 may have a touch sensor associated with the display 306 to provide a touchscreen display configured to receive touch inputs for enabling interaction with a graphic interface presented on the display 306. Accordingly, implementations herein are not limited to any particular display technology. Alternatively, in some examples, the POS device 300 may not include the display 306, and information may be present by other means, such as aurally.

The I/O components 308, meanwhile, may include speakers, a microphone, a camera, and various user controls (e.g., buttons, a joystick, a keyboard, a keypad, etc.), a haptic output device, and so forth.

In addition, the POS device 300 may include or may be connectable to a payment instrument reader 312. In some examples, the reader 312 may plug in to a port in the merchant device, such as a microphone/headphone port, a data port, or other suitable port. In other instances, the reader 312 is integral with the entire POS device 300. The reader may include a read head for reading a magnetic strip of a payment card, and further may include encryption technology for encrypting the information read from the magnetic strip. Alternatively, numerous other types of card readers may be employed with the POS devices 300 herein, depending on the type and configuration of a particular POS device 300.

The location component 314 may include a GPS device able to indicate location information, or the location component 314 may comprise another other location-based sensor. The POS device 300 may also include one or more additional sensors (not shown), such as an accelerometer, gyroscope, compass, proximity sensor, and the like. Additionally, the POS device 300 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims

What is claimed is:

1. A method comprising:
maintaining an expected wait time to provide to customers that provide orders to a merchant;
receiving, from a mobile point-of-sale (POS) device associated with the merchant and at a time-of-day, an indication of a number of mobile electronic devices currently within a threshold distance of the mobile POS device, the mobile POS device having electronically detected the number of mobile electronic devices;
determining a baseline number of mobile electronic devices within the threshold distance of the mobile POS device at the time-of-day, the baseline number calculated from one or more prior days at the time-of-day;
comparing the number of mobile electronic devices to the baseline number of mobile electronic devices;
at least partly in response to determining that the number of mobile electronic devices is greater than the baseline number of mobile electronic devices by a threshold amount, adjusting upwards the expected wait time; and
at least partly in response to determining that the number of mobile electronic devices is less than the baseline number of mobile electronic devices by a threshold amount, adjusting downwards the expected wait time.

2. A method as recited in claim 1, further comprising sending an update to each mobile electronic device associated with an order previously received at the merchant but not yet fulfilled, each respective update updating an expected wait time for the respective order.

3. A method as recited in claim 1, wherein:
the indication is received on a day-of-the-week; and
the baseline number comprises an average or median number of mobile electronic devices within the threshold distance of the mobile POS device at the time-of-day and on the day-of-the-week.

4. A method as recited in claim 1, wherein the baseline number is associated with at least one of a-time-of-day or day-of-the-week.

5. A method as recited in claim 1, wherein the baseline number comprises an average or median number of mobile electronic devices within the threshold distance of the POS device at a time-of-day, the average or median number calculated from one or more prior days at the time-of-day.

6. A method as recited in claim 1, further comprising storing an indication of an updated expected wait time for use in a subsequent order at the merchant.

7. A method as recited in claim 1, wherein the orders comprise an order for at least one of a physical good, a digital good, or a service offered by the merchant.

8. A method as recited in claim 1, wherein the merchant operates a restaurant, and the expected wait time indicates a current wait time before a customer is seated at the restaurant.

9. A method as recited in claim 1, further comprising at least one of determining current weather at a location of the merchant, determining current traffic proximate the location of the merchant, or determining whether a predefined event is scheduled to occur proximate the location of the merchant within a threshold amount of time, and wherein at least one of the adjusting upwards or the adjusting downwards of the expected wait time based at least in part on the at least one of the current weather, the current traffic, or whether a predefined event is scheduled to occur.

10. One or more non-transitory computer-readable media storing computer-executable instructions that, when executed on one or more processors, cause the one or more processors to perform acts comprising:
determining a number of mobile electronic devices in proximity to a point-of-sale (POS) device of a merchant, the POS device having electronically detected the number of mobile electronic devices;
comparing the determined number to a baseline number of mobile electronic devices in proximity to the POS device, the baseline number comprising a number of mobile electronic devices in proximity to the POS device at a time-of-day, the baseline number calculated from one or more prior days at the time-of-day;
determining that the determined number differs from the baseline number by more than a threshold amount; and
adjusting, based at least in part on determining that the determined number differs from the baseline number by more than the threshold amount, an expected wait time at the merchant based at least in part on the determined number of mobile electronic devices in proximity to the POS device of the merchant.

11. One or more non-transitory computer-readable media as recited in claim 10, wherein the adjusted expected wait time is for at least one of future orders of an item offered by the merchant or previously received orders for the item that have yet to be fulfilled.

12. One or more non-transitory computer-readable media as recited in claim 10, wherein the adjusted expected wait time indicates an amount of time before a customer is seated at a restaurant.

13. One or more non-transitory computer-readable media as recited in claim 10, the acts further comprising sending an indication of the adjusted expected wait time to an electronic device associated with a previous order for the item.

14. One or more non-transitory computer-readable media as recited in claim 10, the acts further comprising at least one of determining current weather proximate to the merchant, determining current traffic proximate to the merchant, or determining whether a predefined event is scheduled to occur proximate to the merchant within a threshold amount of time, and wherein the adjusting is further based at least in part on the at least one of the current weather, the current traffic, or whether a predefined event is scheduled to occur.

15. One or more non-transitory computer-readable media as recited in claim 10, wherein the baseline number comprises an average or median number of mobile electronic devices in proximity to the POS at the time-of-day as calculated from the one or more prior days.

16. One or more computing devices comprising:
one or more processors; and
one or more non-transitory computer-readable media storing computer-executable instructions that, when executed on the one or more processors, cause the one or more processors to perform acts comprising:
determining a number of mobile electronic devices in proximity to a point-of-sale (POS) device of a merchant, the POS device having electronically detected the number of mobile electronic devices;
comparing the determined number to a baseline number of mobile electronic devices in proximity to the POS device, the baseline number comprising a number of mobile electronic devices in proximity to the POS device at a time-of-day, the baseline number calculated from one or more prior days at the time-of-day;
determining that the determined number differs from the baseline number by more than a threshold amount; and adjusting, based at least in part on determining that the determined number differs from the baseline number by more than the threshold amount, an expected wait time at the merchant based at least in part on the determined number of mobile electronic devices in proximity to the POS device of the merchant.

17. One or more computing devices as recited in claim 16, wherein the adjusted expected wait time is for at least one of future orders of an item offered by the merchant or previously received orders for the item that have yet to be fulfilled.

18. One or more computing devices as recited in claim 16, wherein the adjusted expected wait time indicates an amount of time before a customer is seated at a restaurant.

19. One or more computing devices as recited in claim 16, the acts further comprising sending an indication of the adjusted expected wait time to an electronic device associated with a previous order for the item.

20. One or more computing devices as recited in claim 16, the acts further comprising at least one of determining current weather proximate to the merchant, determining current traffic proximate to the merchant, or determining whether a predefined event is scheduled to occur proximate to the merchant within a threshold amount of time, and wherein the adjusting is further based at least in part on the at least one of the current weather, the current traffic, or whether a predefined event is scheduled to occur.

21. One or more computing devices as recited in claim 16, wherein the baseline number comprises an average or median number of mobile electronic devices in proximity to the POS at the time-of-day as calculated from the one or more prior days.

* * * * *